(12) United States Patent  
He et al.

(10) Patent No.: US 9,398,439 B2  
(45) Date of Patent: Jul. 19, 2016

(54) METHOD, APPARATUS AND SYSTEM USING CAMEL DIALOGUE SERVICES

(71) Applicant: Alcatel Lucent, Boulogne Billancourt (FR)

(72) Inventors: Yuanyuan He, Shanghai (CN); Yutang Luo, Shanghai (CN); Xin Wang, Shanghai (CN); Hanbin Fang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/591,306

(22) Filed: Jan. 7, 2015

(65) Prior Publication Data

US 2015/0195702 A1 Jul. 9, 2015

(30) Foreign Application Priority Data

Jan. 7, 2014 (CN) .......................... 2014 1 0006834

(51) Int. Cl.
| | |
|---|---|
| H04W 4/00 | (2009.01) |
| H04W 8/06 | (2009.01) |
| H04W 76/06 | (2009.01) |
| H04W 76/02 | (2009.01) |

(52) U.S. Cl.
CPC .............. *H04W 8/06* (2013.01); *H04W 76/028* (2013.01); *H04W 76/066* (2013.01)

(58) Field of Classification Search
CPC .... H04W 8/06; H04W 76/066; H04W 76/028
See application file for complete search history.

(56) References Cited

U.S. PATENT DOCUMENTS

| 8,380,211 | B2* | 2/2013 | Duan | ................. | H04W 36/0022 |
| | | | | | 455/445 |
| 2005/0078812 | A1* | 4/2005 | Batni | ................. | H04M 3/42017 |
| | | | | | 379/207.16 |
| 2006/0178135 | A1* | 8/2006 | Jiang | ................. | H04M 3/42042 |
| | | | | | 455/414.1 |
| 2010/0220667 | A1* | 9/2010 | Noldus | ................. | H04W 8/082 |
| | | | | | 370/329 |
| 2010/0304705 | A1* | 12/2010 | Hursey | ................. | H04M 11/04 |
| | | | | | 455/404.1 |
| 2010/0330987 | A1* | 12/2010 | Lee | ................. | H04W 8/26 |
| | | | | | 455/432.1 |
| 2012/0083265 | A1* | 4/2012 | Noldus | ................. | H04W 8/08 |
| | | | | | 455/426.1 |

* cited by examiner

*Primary Examiner* — Erin File

(74) *Attorney, Agent, or Firm* — Fay Sharpe, LLP

(57) ABSTRACT

An objective of the present invention is a method, apparatus, and a system using a CAMEL service. According to the method of the present invention, the method comprises the following steps during a process in which a called user equipment moves from an original visit mobile switch center (VMMSC) to a new VMSC: when receiving roaming retry information from the original VMSC, generating a first send routing information containing suppress Terminating CAMEL Subscription Information (TCSI) indicator of the CAMEL dialog service; sending the first send routing information to a home location register, so as to request a mobile station roaming number of the called user equipment in said new MSC. According to the method of the present invention, the initial CAMEL service connection is always maintained during the MTRR process, without bothering to interrupt and re-invoke various kinds of CAMEL services, thereby shortening the call setting time during the MTRR process; besides, the communication load of the network ss7 is reduced, and the network resources are saved. Particularly during the RBT service process, the user will not hear two different ringtones any more, which enhances the user experience.

9 Claims, 6 Drawing Sheets

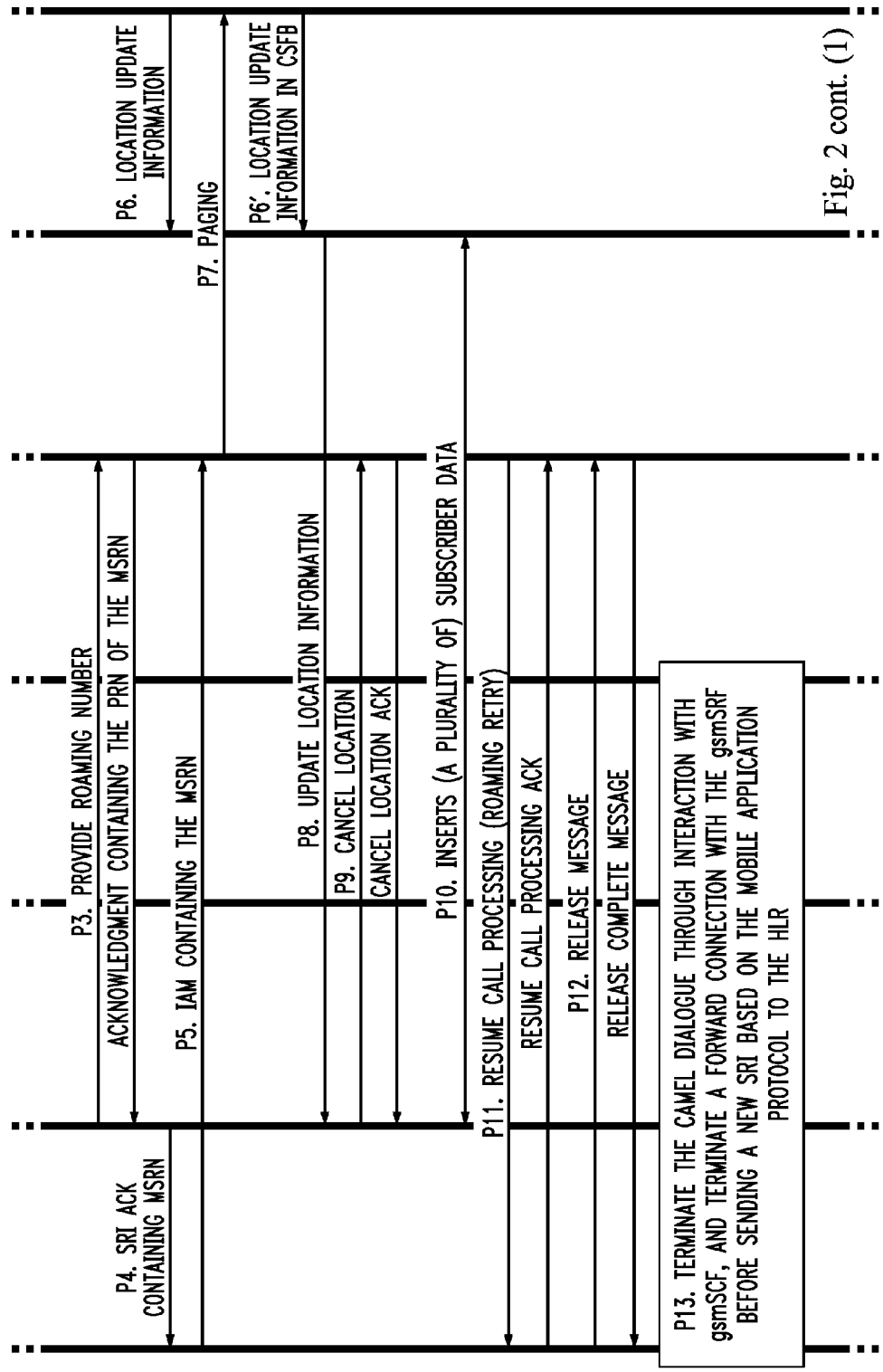
Fig. 2 cont. (1)

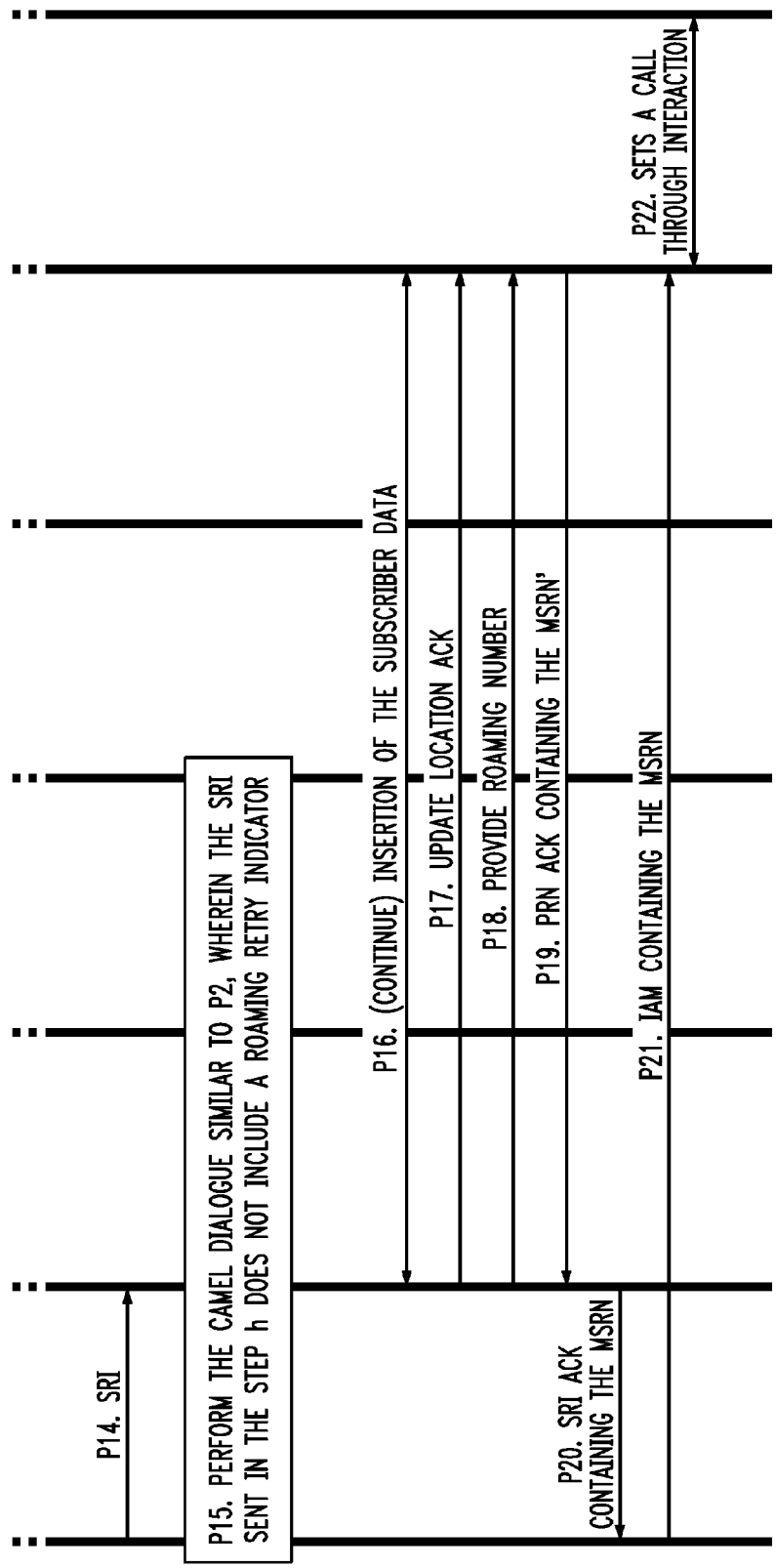
Fig. 2 cont. (2)

METHOD, APPARATUS AND SYSTEM USING CAMEL DIALOGUE SERVICES

FIELD OF THE INVENTION

The present invention relates to the field of communications, and more specifically, a method, apparatus and system for using CAMEL dialogue services.

BACKGROUND OF THE INVENTION

In the existing mobile terminating calls, when a called mobile device is moving from one MSC (Mobile Switch Center) to another MSC, an MTRR (Mobile Terminating Roaming Retry) service may be applied to the mobile terminating calls; when the MSC for the user to send LAU (location update) is different from the MSC paging the UE, the MTRR will also be applied to a 4G CSFB (Circuit Switched Fallback) mobile call.

According to the 3GPP protocol, when the gateway mobile switching center (GMSC) receives an instruction for retrying the mobile terminating call, the GMSC should terminate the ongoing CAMEL dialogue service, such that the CAMEL service is re-invoked due to MTRR.

Refer to FIG. 1 and FIG. 2. FIG. 1 schematically shows a mobile communication system configured to provide a CAMEL service, wherein a part of information flow during the call process is also illustrated, and FIG. 2 schematically shows a call flow diagram of obtaining a CAMEL service during an MTRR process.

Herein, the mobile communication system comprises at least one HLR (Home location Register), at least one gsmSCF (GSM Service Control Function), at least one gsmSRF (GSM Special Resource Function), one or more VMSCs (Visited Mobile Switch Center), and at least one GMSC (Gateway Mobile Switch Center).

Specifically, when a calling party pages a called party, with reference to FIG. 2, in the flow P1, the GMSC sends, to an HLR, SRI (Send Routing Information) containing called party device identification information and a roaming retry identification, so as to request the HLR for an suppress TCSI (Terminating CAMEL Subscription information) indicator of the CAMEL service available in the current network.

Next, in a flow P2 for establishing a CAMEL session, in sub-flow a, the HLR feeds back to the GMSC the suppress TCSI indicator containing the currently available CAMEL service.

Next, in the sub-flow b, the GMSC sends an initial detection point to the gsmSCF (also called SCP, Service Control Point).

Next, in the sub-flow c, the gsmSCF sends, to the GMSC, a Request Report BCSM (Basic Call Status Model) Event, so as to configure the event information including, but not limited to the following, for the GMSC: EDP-13R (T-Busy), EDP-14R (T_NoAnswer), EDP15-R (T_Answer) and EDP-18R (T_Abandon).

Next, in sub-flow d, gsmSCF sends Establish Temporary Connection information to the GMSC, wherein a particular number of qualifier fields of the information contain an SSPIP (Service Switching Point IP) IP routing address, for indicating the RBT ring.

Next, in sub-flow e, the GMSC sends an IAM (Initial Address Message) to the gsmSRF (also called assisting MSC) based on the Assisting SSPIP Routing Address.

Next, in sub-flow f, the gsmSRF feeds back, to the GMSC, an ACM (Address Complete Message)/ANM (Answer Message) based on an ISDN (Integrated Services Digital Network) User Part protocol. Wherein a voice channel from the gsmSRF to the calling party is established through a GMSC (see the single solid-line arrow portion in FIG. 1). With a RBT service as an example, music or ringtone is played to the calling party now.

Next, in sub-flow g, gsmSCF sends "Continue" to GMSC, so as to maintain the CAMEL dialogue.

Next, in sub-flow h, the GMSC sends, to the HLR, an SRI containing the suppress TCSI indicator, so as to ask the HLR for a MSRN (Mobile Station Roaming Number) of the called party device at the original VMSC.

Next, in the flow P3, the HLR sends PRN (Provide Roaming Number) information to the original VSMC, and receives a PRN acknowledgement information that is fed back from the original VMSC and that includes the MSRN of the called party device in the original VMSC. Wherein the PRN contains an IE (Information Element) supported by the MT roaming retry, wherein in respective flows shown in FIG. 2, it is required to determine whether a corresponding message contains the IE supported by a corresponding MT roaming retry, so as to determine whether a corresponding operation may be performed using the MTRR technology, which will not be detailed here.

Next, in the flow P4, the HLR feeds back the SRI acknowledgement information to the GMSC, that SRI acknowledgement information contains the MSRN of the called party at the original VMSC.

Next, in the flow P5, the GMSC sends an IAM containing the MSRN to the original VMSC based on the received MSRN.

Next, in the flow P7, after the original VMSC receives the IAM, paging the called party starts.

Preferably, in the flow P6, the location of the called device changes, and location update information is sent to a new VMSC to which the called device is migrated. Or, the location update information is sent to the new VMSC in conjunction with the Circuit Switch Fallback technology, wherein the flow P6 may be performed before or after P7.

Next, in flow P8, the new VMSC sends the update location information to the HLR.

Next, in flow P9, the HLR sends Cancel Location information to the original VMSC and receives confirmation information from the original VMSC.

Next, in flow P10, the HLR inserts a plurality of subscriber data into the new VMSC.

Next, in flow P11, after the original VMSC stop paging, it sends Resume Call Processing (Roaming Retry) information to the GMSC and receives a Resume Call Processing acknowledgement from the GMSC.

Next, in flow P12, the GMSC sends a release message to the original VMSC and receives a Release Complete message fed back from the original VMSC, so as to complete a release process of call connection.

Next, in flow P13, when the GMSC receives the Release Complete message from the original VMSC, it terminates the CAMEL session with the gsmSCF, and terminates a forward connection with the gsmSRF.

Next, in the flow P14, an operation similar to the above flow P1 is performed to send an SRI to the HLR to request for the suppress TCSI indicator of the CAMEL service available in the current network.

Next, in the flow P15, sub-flows a to h similar to which in the above flow P2 are re-performed, wherein the SRI sent to the HLR in the sub-flow h here contains the suppress TCSI indicator, but does not contain a roaming retry identification.

Then, in the flow P16, the HLR continues to insert a plurality of subscriber data into the new VMSC.

Then, in the flow P17, the HLR sends Update Location Acknowledgement Information to the new VMSC.

Then, in the flow P18, the HLR sends a PRN to the new VMSC.

Then, in the flow P19, the HLR receives a PRN acknowledgement information that is fed back from the original VMSC and contains the MSRN' of the called party in the new VMSC.

Then, in the flow P20, the HLR sends an SRI Acknowledgement information containing the MSRN' to the GMSC.

Then, in the flow P21, the GMSC sends an IAM containing the MSRN' to the new VMSC based on the received MSRN'.

Next, in the flow P22, the new VMSC sets a call through interaction with the called device, and starts re-paging the called device after receiving the IAM.

However, this service process has many drawbacks, mainly has following several aspects:

1) prolonging the call setting time. Since this process not only needs retrying the MT mobile terminating call, but also needs recalling the CAMEL service; therefore, the setup time of the call will be prolonged; 2) wasting resources. As it has to first interrupt the CAMEL services before re-calling the CAMEL service so as to retry the mobile terminating call, which causes the communication load of the ss7 (Signaling System No. 7) of the MAP and CAP-based network; 3) degrading user experience. When the user is using a CAMEL service, e.g., using a RBT service, during the process of re-calling after the CAMEL service is terminated, the user will hear the ringtones twice, and the ringtones might be different, which may disturb the calling party. Such circumstance may likewise exist in the LTE network and occur when the 4G subscriber circuit domain falls back to 3G.

SUMMARY OF THE INVENTION

An objective of the present invention is a method, apparatus, and system of a CAMEL (Customized Application for Mobile network Enhanced Logic) dialogue service.

According to one aspect of the present invention, there is provided a method of using a CAMEL (Customized Application for Mobile network Enhanced Logic) service in a gateway mobile switch center (GMSC), wherein said method comprises the following steps during a process in which a called user equipment moves from an original visit mobile switch center (VMMSC) to a new VMSC:

a. when receiving roaming retry information from the original VMSC, generating a first send routing information containing suppress Terminating CAMEL Subscription Information (TCSI) indicator of the CAMEL dialogue service;

b. sending the first send routing information to a home location register, so as to request a mobile station roaming number of the called user equipment in said new MSC.

According to one aspect of the present invention, there is further provided a gateway mobile switch center (GMSC) using a CAMEL (Customized Application for Mobile network Enhanced Logic) service, wherein the GMSC comprises the following devices to perform operations during a process in which a called user equipment moves from an original visit mobile switch center (VMMSC) to a new VMSC:

a generating device configured to, when receiving roaming retry information from the original VMSC, generate first send routing information containing suppress Terminating CAMEL Subscription Information (TCSI) indicator of the CAMEL dialogue service;

a first sending device configured to send the first send routing information to a home location register to request a mobile station roaming number of the called user equipment at the new MSC.

According to one aspect of the present invention, there is further provided a mobile communication system capable of providing a CAMEL service, wherein said mobile communication system at least one Home location Register (HLR), at least one GSM Service Control Function (gsmSCF), at least one GSM Special Resource Function (gsmSRF), one or more Visited Mobile Switch Centers (VMSCs), and at least one Gateway Mobile Switch Center (GMSC).

Compared with the prior art, the present invention has the following advantages: since the GMSC will not perform an operation of terminating the CAMEL service after having received roaming retry information, and the first SRI sent thereby to the HLR has contained the suppress TCSI indicator, the CAMEL service will not be re-triggered; instead, the mobile station roaming number of the called user equipment at the new VMSC that currently performs a paging operation is directly obtained for the GMSC; in other words, according to the method of the present invention, the initial CAMEL service connection is constantly maintained during the MTRR process, without a need of interrupting and re-invoking various kinds of CAMEL services, thereby shortening the call setting time during the MTRR process; besides, the communication load of the network ss7 is reduced, and the network resource is saved. Particularly, during the RBT service process, the user will not hear two different ringtones, which thereby enhances user experience.

BRIEF DESCRIPTION OF THE ACCOMPANYING DRAWINGS

Other features, objectives, and advantages of the present invention will become more apparent through reading the following detailed description of the non-limiting embodiments with reference to the following accompanying drawings, wherein:

FIG. 1 schematically shows a structural diagram of a mobile communication system providing a CAMEL service;

In the accompanying drawings, same or similar reference numerals represent same or similar components.

DETAILED DESCRIPTION OF THE PREFERRED EMBODIMENTS

Hereinafter, the present invention will be described further in detail with reference to the accompanying drawings.

Herein, the mobile communication system for providing a CAMEL (Customized Application for Mobile network Enhanced Logic) service according to the present invention comprises at least one HLR (Home location Register), at least one gsmSCF (GSM Service Control Function), at least one gsmSRF (GSM Special Resource Function), one or more VMSCs (Visited Mobile Switch Center), and at least one GMSC (Gateway Mobile Switch Center) according to the present invention.

Herein the CAMEL service comprises a plurality of types of personalized enhanced services. For example, a ringback tone (RBT); for another example, a pre-paid service, etc.

Figure 3:
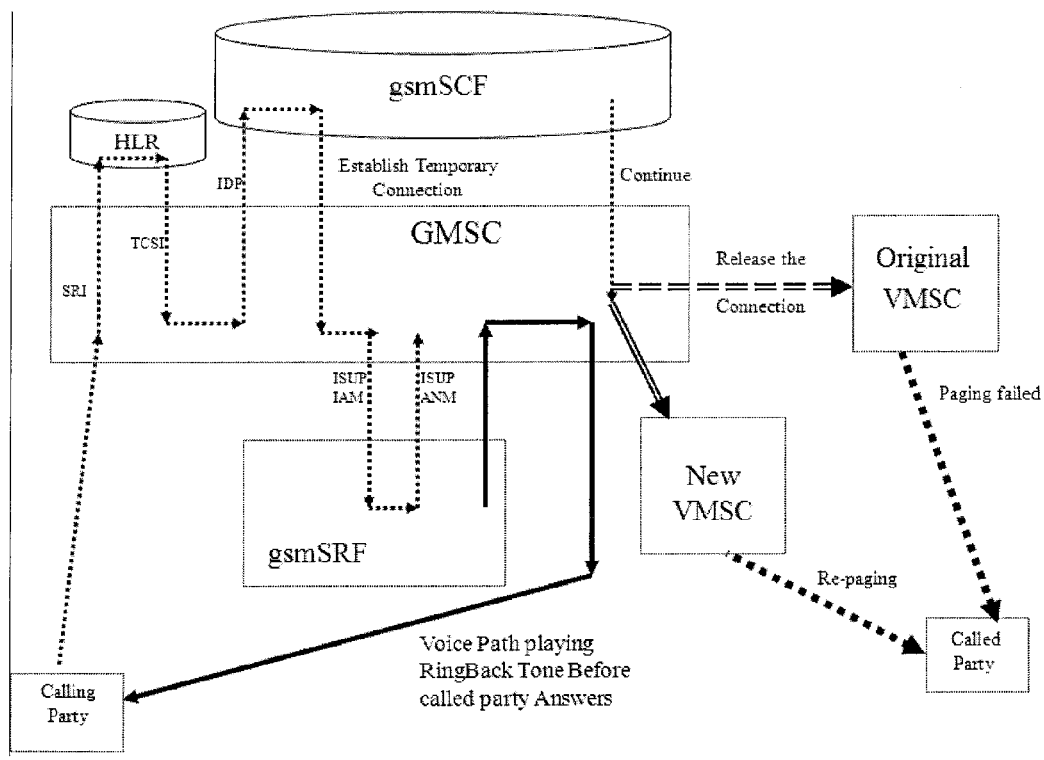
FIG. 3 shows a structural diagram of a mobile communication system for providing a CAMEL service according to the present invention.

Refer to FIG. 3, in which a structural diagram of a mobile communication system for providing a CAMEL service according to the present invention is presented, wherein the called user equipment is moving from the original VMSC to a new VMSC during a call process.

Figure 4:
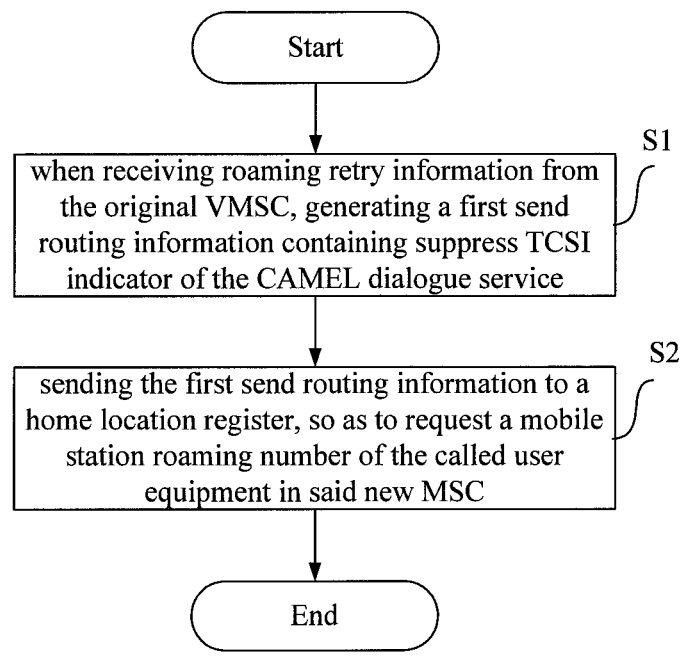
FIG. 4 shows a flow diagram of a method sing g a CAMEL (Customized Application for Mobile network Enhanced Logic) dialogue service according to the present invention.

Specifically, refer to FIG. 4. FIG. 4 illustrates a method according to the present invention for obtaining the GMSC of the CAMEL service. Wherein, according to the method of the present invention, the GMSC performs steps S1 and S2 during the procedure in which the called user equipment moves from the original VMSC to a new VMSC.

Figure 1:
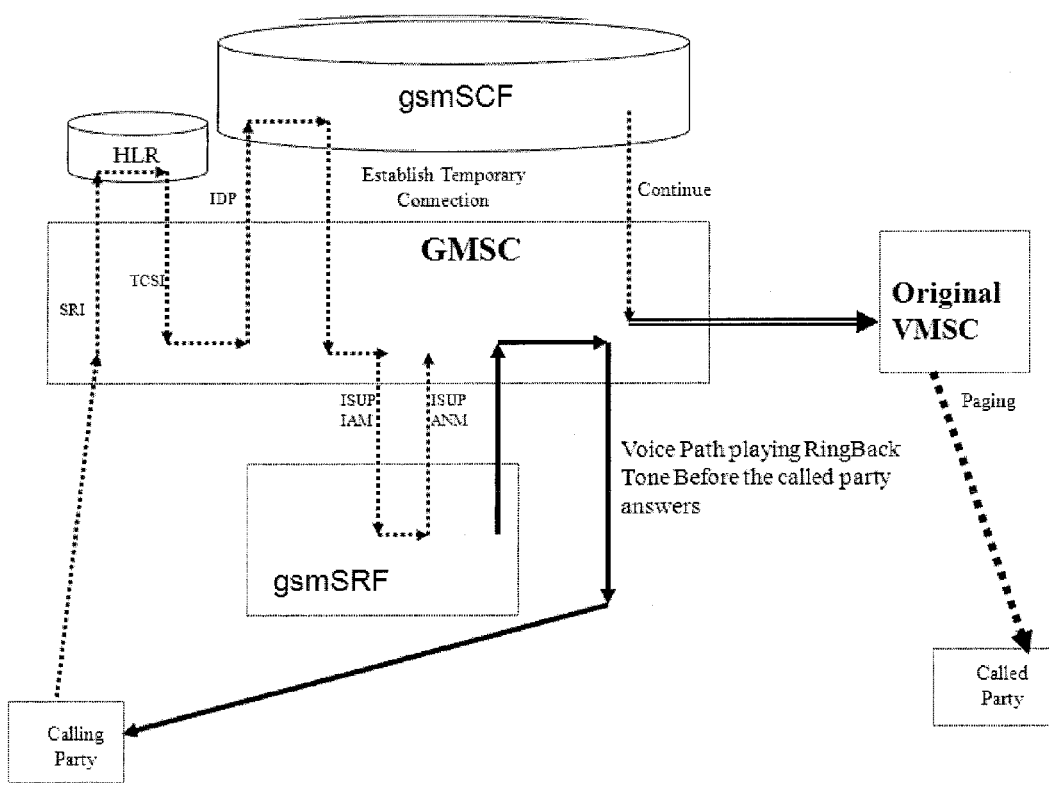
Figure 2:
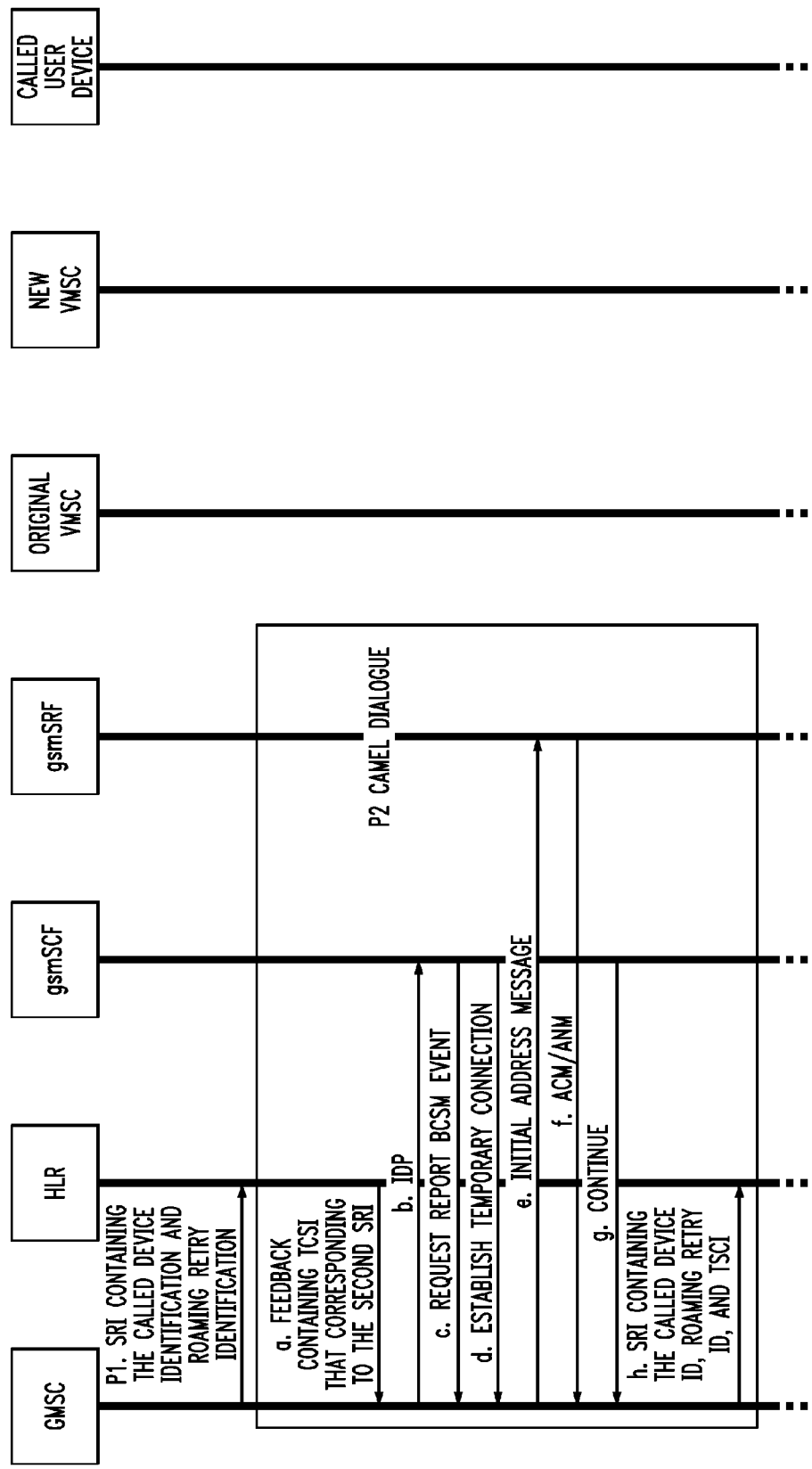
FIG. 2 shows a flow diagram of using a CAMEL (Customized Application for Mobile network Enhanced Logic) dialogue service according to prior art.

Wherein, during a normal call, the mobile communication system triggers the CAMEL service through flows P1 to P7 identical to what is shown in FIG. 2, and the called user equipment is paged by the original VMSC.

Next, continue referring to P8 to P10 in FIG. 2. When the called user equipment moves from the original VMSC to the new VMSC, the HLR interacts with the original VMSC through the flow shown in FIG. 2 to cancel the connection to the original VMSC.

Afterwards, the original VMSC sends a roaming retry information to the GMSC (referring to P11 in FIG. 2), wherein the roaming retry information is for prompting the GMSC to re-page the called user equipment.

Next, in step S1, when the roaming retry information from the original VMSC is received, the GMSC generates, based on the Suppress TCSI (Suppress Terminating CAMEL specification information) indicator of the CAMEL dialogue service obtained when starting the call normally, a first Send Routing Information containing the Suppress TCSI indicator.

Herein, the first Send Routing Information does not contain a Roaming Retry Indicator.

Preferably, the GMSC obtains the Suppress TSCI indicator through performing steps S11 and S12.

In step S11, when the GMSC is prepared to call the called user equipment, it sends, to the home location register, a second SRI for requesting for the Suppress Terminating CAMEL subscription indicator of the available CAMEL service.

Herein, the second SRI does not include a Suppress TSCI identification of the above available CAMEL service.

Herein, the second SRI includes the device identification information of the called user equipment and a roaming retry indication indicates that it supports MTRR.

Next, in step S12, the GMSC receives the Suppress TSCI indicator fed back by the HLR based on the second SRI.

Afterwards, the GMSC generates a third SRI containing the received Suppress TSCI indicator, the device identification information of the called user equipment, and a roaming retry indicator, and sends the third SRI to the HLR to request the MSRN (Mobile Station Roaming Number) of the current paged called user equipment in the original VMSC. Next, the GMSC establishes a connection with the original VLSC based on the obtained mobile communication roaming number, such that the original VMSC pages the called user equipment.

Preferably, the processing manner of the step S11 is identical to that in the flow P1 as shown with reference to FIG. 2.

Preferably, the processing manner of the step S12 is identical to the sub-flow a in the flow P2 as shown in FIG. 2.

Next, in step S2, the GMSC sends the first Send Routing Information to the home location register, so as to request the mobile station roaming number of the called user equipment at the new VMSC.

According to one preferred embodiment of the present invention, the method further comprises step S3, and the step S2 further comprises step S201.

In step S3, when the roaming retry information from the original VMSC is received, the GMSC sends a release message to the original VMSC so as to release a call connection with the original VMSC.

Preferably, the step S3 is similar to the flow P12 shown with reference to FIG. 2.

Next, in step S201, after receiving a release complete message fed back from the original VMSC based on the release information, a first send routing information is sent to a home location register, so as to request for the mobile station roaming number of the called user equipment in the new VMSC.

Herein, the mobile station roaming number is used for identifying a called user equipment which corresponds to the current VMSC and may be paged.

According to a first example of the present invention, the CAMEL service includes a RBT service. The GMSC obtains the Suppress TSCI indicator corresponding to the RBT service through performing step S11 and step S12, and establishes a connection with the original VMSC, such that it pages the called user equipment. Next, during the paging process, when the called user equipment moves from the original VMSC to the new VMSC, the called user equipment sends a location update information to the new VMSC, and causes the original VMSC to terminate paging the called user equipment through performing flows P8 and P9 with reference to FIG. 2. Afterwards, the original VMSC sends a roaming retry information to the GMSC. Then, in step S1, the GMSC generates a first SRI containing the Suppress TCSI indicator of the CAMEL dialog service, and in step S3, release information REL is sent to the original VMSC. The original VMSC releases the connection after receiving the REL; and feeds back the release complete information RCL to the GMSC after the release operation is completed. Then, when the GMSC receives the release complete information RCL as fed back from the original VMSC, it sends the first SRI to the HLR, so as to request the HLR for the mobile station roaming number of the called user equipment in the new VMSC.

It should be noted that there is no sequence of execution between step S1 and step S3. The GMSC may first perform step S1 to generate an SRI containing the suppress TSCI indicator, and then perform step S3 to send a release message to the original VMSC; or, first perform step S3 to send a release message to the original VMSC and then perform step S1 to generate an SRI containing the suppress TSCI indicator; or, perform steps S1 and S3 simultaneously.

According to a further preferred embodiment of the present invention, the method further comprises step S4 (not shown) and step S5 (not shown).

In step S4, the GMSC receives the mobile station roaming number of the called user equipment in the new VMSC from the home location register.

Next, in step S5, the GMSC sends an initial address message to the new VMSC based on the mobile station roaming number of the called user equipment in the new VMSC, such that the new VMSC establishes a call connection with the called user equipment.

Continue illustration of the first example, in which after receiving the above mentioned SRI, based on the Suppress TSCI indicator therein, the HLR performs operations similar to flows P16 to P19 as shown in FIG. 2 so as to interact with the new VMSC, to obtain the MSRN of the called user equipment in the new VMSR, and feed it back to the GMSC. Then, after the GMSC receives the MSRN of the new VMSC as fed back by the HLR based on the first SRI, based on sending the initial address information containing the MSRN to the new VMSC, the new VMSC is caused to page the called user equipment, so as to establish a call connection between the new VMSC and the called user equipment (as shown in the dotted-line arrows in FIG. 3).

Preferably, the step S4 is similar to the flow P20 as shown in FIG. 2.

Preferably, the step S5 is similar to the flow P21 as shown in FIG. 2.

In this case, the connection channel in the mobile communication system of the present invention is shown in FIG. 3, wherein the connection between the VMSC and the GMSC is released (as shown by the double-dotted-line arrow in FIG. 3), and a call connection between the new VMSC and the GMSC is established (as shown by the double-solid-line arrow in FIG. 3), such that the new VMSC re-pages the called user equipment. However, during the whole process, the CAMEL session is not terminated (as shown by the dotted-line arrows in the figure); moreover, the connection channel between the calling party, the GMSC, and the gsmSRF always maintains connected (as shown in the single solid-line arrow in the figure). In other words, during this process, the CAMEL service is always provided to the user consistently. With the RBT service as an example, what is always heard by the user during this process is a consistent ringtone, rather than abrupt interruption and then playing a new segment of ringtone like in the prior art.

According to a further preferred embodiment of the present invention, the original VMSC and the new VMSC belong to networks constructed based on different digital communication technologies, respectively.

For example, in the TD-LTE environment, the original VMSC is located in the 4G network, while the new VMSC is located in the 3G network; for another example, the original VMSC is located in the 3G network, while the new VMSC is located in the 2/3G network, and the like.

Preferably, the method according to the present invention may perform the previous conversion between the original VMSC and the new VMSC in conjunction with the circuit switched fallback (CSFB).

It may be seen that according to the present invention, by performing the above step S1 and step S2, it would be unnecessary to re-perform the flows of sections P13 to P15 in the prior art. In other words, because the GMSC does not perform operations of terminating the CAMEL service after receiving the roaming retry information; moreover, the first SRI sent to the HLR has contained the Suppress TCSI indicator, it will not re-trigger the CAMEL service; instead, it directly obtains, for the GMSC, the mobile station roaming number of the new VMSC where the called user equipment is currently performing a paging operation. In other words, according to the method of the present invention, the initial CAMEL service connection is always maintained during the MTRR process, without bothering to interrupt and re-invoke various kinds of CAMEL services, thereby shortening the call setting time during the MTRR process; besides, the communication load of the network ss7 is reduced, and the network resources are saved. Particularly during the RBT service process, the user will not hear two different ringtones any more, which enhances the user experience.

Figure 5:
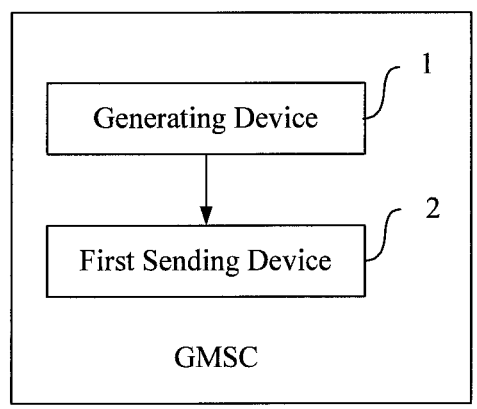
FIG. 5 shows a structural diagram of a GMSC using a CAMEL (Customized Application for Mobile network Enhanced Logic) dialogue service according to the present invention.

FIG. 5 shows a GMSC according to the present invention. The GMSC according to the present invention comprises a generating device 1 and a first sending device 2, for performing operations during a process in which the called user equipment moves from the original visit mobile switched center (VMSC) to a new VMSC.

Herein, during a normal call, by performing flows P1 to P7 identical to what are shown in FIG. 2, the mobile communication system triggers the CAMEL service, and the original VMSC pages the called user equipment.

Next, continue referring to P8 to P10 in FIG. 2. When the called user equipment moves from the original VMSC to the new VMSC, the HLR interacts with the original VMSC through the flow shown in FIG. 2 to cancel the connection to the original VMSC.

Afterwards, the original VMSC sends a roaming retry information to the GMSC (referring to P11 in FIG. 2), wherein the roaming retry information is for prompting the GMSC to re-page the called user equipment.

Next, when the roaming retry information from the original VMSC is received by the GMSC, the generating device 1 generates, based on the Suppress TCSI (Suppress Terminating CAMEL specification information) indicator of the CAMEL dialogue service obtained when starting the call normally, a first Send Routing Information containing the Suppress TCSI indicator.

Herein, the first Send Routing Information does not contain a Roaming Retry Indicator.

Preferably, the GMSC obtains the Suppress TSCI indicator through a third sending device (not shown) and a second receiving device (not shown).

When the GMSC is prepared to call the called user equipment, the third sending device sends, to the home location register, a second SRI for requesting for the Suppress Terminating CAMEL subscription indicator of the available CAMEL service.

Herein, the second SRI does not include a Suppress TSCI identification of the above available CAMEL service.

Herein, the second SRI includes the device identification information of the called user equipment and a roaming retry indication indicates that it supports MTRR.

Next, the second receiving device receives the Suppress TSCI indicator fed back by the HLR based on the second SRI.

Afterwards, the GMSC generates a third SRI containing the received Suppress TSCI indicator, the device identification information of the called user equipment, and a roaming retry indicator, and sends the third SRI to the HLR to request the MSRN (Mobile Station Roaming Number) of the current paged called user equipment in the original VMSC. Next, the GMSC establishes a connection with the original VLSC based on the obtained mobile communication roaming number, such that the original VMSC pages the called user equipment.

Preferably, the operation of the third sending device is identical to that in the flow P1 as shown with reference to FIG. 2.

Preferably, the operation of the second device is identical to the sub-flow a in the flow P2 as shown in FIG. 2.

Next, the first sending device 2 sends the first Send Routing Information to the home location register, so as to request the mobile station roaming number of the called user equipment at the new VMSC.

According to one preferred embodiment of the present invention, the method further comprises a sub-sending device (not shown).

When the roaming retry information from the original VMSC is received, the sub-sending device of the GMSC sends a release message to the original VMSC so as to release a call connection with the original VMSC.

Preferably, the operation of the sub-sending device is similar to the flow P12 shown with reference to FIG. 2.

Next, after receiving a release complete message fed back from the original VMSC based on the release information, the first sending device sends a first send routing information to a home location register, so as to request for the mobile station roaming number of the called user equipment in the new VMSC.

Herein, the mobile station roaming number is used for identifying a called user equipment which corresponds to the current VMSC and may be paged.

According to a first example of the present invention, the CAMEL service includes a RBT service. The GMSC obtains the Suppress TSCI indicator corresponding to the RBT service through the third sending device (not shown) and the second receiving device (not shown), and establishes a connection with the original VMSC, such that it pages the called user equipment. Next, during the paging process, when the called user equipment moves from the original VMSC to the new VMSC, the called user equipment sends a location update information to the new VMSC, and causes the original VMSC to terminate paging the called user equipment through performing flows P8 and P9 with reference to FIG. 2. Afterwards, the original VMSC sends a roaming retry information to the GMSC. Then, the generating device 1 generates a first SRI containing the Suppress TCSI indicator of the CAMEL dialog service, and the sub-sending device sends release information REL to the original VMSC. The original VMSC releases the connection after receiving the REL; and feeds back the release complete information RCL to the GMSC after the release operation is completed. Then, when the GMSC receives the release complete information RCL as fed back from the original VMSC, the first sending device sends the first SRI to the HLR, so as to request the HLR for the mobile station roaming number of the called user equipment in the new VMSC.

It should be noted that there is no execution sequence between the generating device 1 and the sub-sending device. The generating device may perform operation first to generate an SRI containing the suppress TSCI indicator, and then the sub-sending device performs operation to send a release message to the original VMSC; or, the sub-sending device may perform operation first to send a release message to the original VMSC, and then the generating device 1 performs operation to generate an SRI containing the suppress TSCI indicator; or, the generating device 1 and the sub-sending device may perform operation simultaneously.

According to a further preferred embodiment of the present invention, the GMSC further comprises a receiving device (not shown) and a second sending device (not shown).

The receiving device receives the mobile station roaming number of the called user equipment in the new VMSC from the home location register.

Next, the second sending device sends an initial address message to the new VMSC based on the mobile station roaming number of the called user equipment in the new VMSC, such that the new VMSC establishes a call connection with the called user equipment.

Continue illustration of the first example, in which after receiving the above mentioned SRI, based on the Suppress TSCI indicator therein, the HLR performs operations similar to flows P16 to P19 as shown in FIG. 2 so as to interact with the new VMSC, to obtain the MSRN of the called user equipment in the new VMSR, and feed it back to the GMSC. Then, after the receiving device receives the MSRN of the new VMSC as fed back by the HLR based on the first SRI, the second sending device sends the initial address information containing the MSRN to the new VMSC, the new VMSC is caused to page the called user equipment, so as to establish a call connection between the new VMSC and the called user equipment (as shown in the dotted-line arrows in FIG. 3).

Preferably, the operation of the second sending device is similar to the flow P21 as shown in FIG. 2.

In this case, the connection channel in the mobile communication system of the present invention is shown in FIG. 3, wherein the connection between the VMSC and the GMSC is released (as shown by the double-dotted-line arrow in FIG. 3), and a call connection between the new VMSC and the GMSC is established (as shown by the double-solid-line arrow in FIG. 3), such that the new VMSC re-pages the called user equipment. However, during the whole process, the CAMEL session is not terminated (as shown by the dotted-line arrows in the figure); moreover, the connection channel between the calling party, the GMSC, and the gsmSRF always maintains connected (as shown in the single solid-line arrow in the figure). In other words, during this process, the CAMEL service is always provided to the user consistently. With the RBT service as an example, what is always heard by the user during this process is a consistent ringtone, rather than abrupt interruption and then playing a new segment of ringtone like in the prior art.

According to a further preferred embodiment of the present invention, the original VMSC and the new VMSC belong to networks constructed based on different digital communication technologies, respectively.

For example, in the TD-LTE environment, the original VMSC is located in the 4G network, while the new VMSC is located in the 3G network; for another example, the original VMSC is located in the 3G network, while the new VMSC is located in the 2/3G network, and the like.

Preferably, the GMSC according to the present invention may perform the previous conversion between the original VMSC and the new VMSC in conjunction with the circuit switched fallback (CSFB).

It may be seen that according to the present invention, through the operation by the generating device 1 and the first sending device 2, it would be unnecessary to re-perform the flows of sections P13 to P15 in the prior art. In other words, because the GMSC does not perform operations of terminating the CAMEL service after receiving the roaming retry information; moreover, the first SRI sent to the HLR has contained the Suppress TCSI indicator, it will not re-trigger the CAMEL service; instead, it directly obtains, for the GMSC, the mobile station roaming number of the new VMSC where the called user equipment is currently performing a paging operation. In other words, according to the method of the present invention, the initial CAMEL service connection is always maintained during the MTRR process, without bothering to interrupt and re-invoke various kinds of CAMEL services, thereby shortening the call setting time during the MTRR process; besides, the communication load of the network ss7 is reduced, and the network resources are saved. Particularly during the RBT service process, the user will not hear two different ringtones any more, which enhances the user experience.

It should be noted that, there is no ordering of execution between the generating module 1 and the sub-sending module. The generating module 1 may first perform an operation to generate a SRI containing the Suppress TSCI identification, and then the sub-sending module performs an operation to send a release message to the original VMSC; or, the sub-sending module performs an operation to send the release message to the original VMSC, and then the generating module 1 performs an operation to generate the SRI containing the suppress TSCI; or, the generating module 1 and the sub-sending module perform operations simultaneously.

To those skilled in the art, it is apparent that the present invention is not limited to the details of the above exemplary embodiments, and the present invention may be implemented with other embodiments without departing from the spirit or basic features of the present invention. Thus, in any way, the embodiments should be regarded as exemplary, not limitative; the scope of the present invention is limited by the appended claims, instead of the above depiction. Thus, all variations intended to fall into the meaning and scope of equivalent elements of the claims should be covered within the present invention. No reference signs in the claims should be regarded as limiting the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

The invention claimed is:

1. A method of using a CAMEL (Customized Application for Mobile network Enhanced Logic) service in a gateway mobile switch center (GMSC), wherein the method comprises the following during a process in which a called user equipment moves from an original visit mobile switch center (VMSC) to a new VMSC:
   when receiving roaming retry information from the original VMSC, generating a first send routing information containing suppress Terminating CAMEL Subscription Information (TCSI) indicator of the CAMEL dialogue service;
   sending a release message to said original VMSC to release a call connection with the original VMSC;
   after receiving a release complete message fed back from the original VMSC based on the release information, sending the first send routing information to a home location register, so as to request for a mobile station roaming number of the called user equipment in the new VMSC;
   receiving a mobile station roaming number of said called user equipment in said new VMSC from said home location register; and
   sending an initial address message to said new VMSC based on the mobile station roaming number of said called user equipment in said new VMSC, such that the new VMSC establishes a call connection with the called user equipment.

2. The method according to claim 1, wherein the method further comprises:
   when prepared to call the called user equipment, sending, to the home location register, second send routing information for the requesting for suppress TCSI indicator of the available CAMEL service;
   receiving the suppress TCSI indicator fed back by the home location register based on the second send routing information.

3. The method according to claim 1, wherein said CAMEL dialogue service comprises a personalized ringback tone service.

4. The method according to claim 1, wherein the original VMSC and the new VMSC belong to networks constructed based on different digital communication technologies, respectively.

5. A gateway mobile switch center (GMSC) for using a CAMEL (Customized Application for Mobile network Enhanced Logic) service, wherein the GMSC comprises the following devices to perform operations during a process in which a called user equipment moves from an original visit mobile switch center (VMSC) to a new VMSC:
   a generating device configured to, when receiving roaming retry information from the original VMSC, generate first send routing information containing suppress Terminating CAMEL Subscription Information (TCSI) indicator of the CAMEL dialogue service;
   a sub-sending device configured to send a release message to said original VMSC to release a call connection with the original VMSC;
   a first sending device configured to, after receiving a release complete message fed back from the original VMSC based on the release information, send the first send routing information to a home location register, to request a mobile station roaming number of the called user equipment in the new MSC;
   a receiving device configured to receive a mobile station roaming number of said called user equipment in said new VMSC from the home location register; and
   a second sending device configured to send an initial address message to said new VMSC based on the mobile station roaming number of said called user equipment in said new VMSC, such that said new VMSC establishes a call connection with the called user equipment.

6. The GMSC according to claim 5, wherein the GMSC further comprises the following devices:
   a third sending device configured to, when prepared to call the called user equipment, send, to said home location register, second send routing information for requesting suppress TCSI indicator of the available CAMEL service;
   a second receiving device configured to receive the suppress TCSI indicator fed back by the home location register based on the second send routing information.

7. The GMSC according to claim 5, wherein said CAMEL dialogue service comprises a personalized ringback tone service.

8. The GMSC according to claim 5, wherein said original VMSC and the new VMSC belong to networks constructed based on different digital communication technologies, respectively.

9. A mobile communication system capable of providing a CAMEL service, wherein said mobile communication system includes at least one Home location Register (HLR), at least one GSM Service Control Function (gsmSCF), at least one GSM Special Resource Function (gsmSRF), one or more Visited Mobile Switch Centers (VMSCs), and at least one Gateway Mobile Switch Center (GMSC) according to claim 5.

* * * * *